US008607148B2

(12) United States Patent
Singh et al.

(10) Patent No.: US 8,607,148 B2
(45) Date of Patent: Dec. 10, 2013

(54) METHOD AND SYSTEM FOR PERFORMING DRAG AND DROP OPERATION

(75) Inventors: Gurpreet Singh, New Delhi (IN); Vinoth Rajasekaran, Bangalore (IN)

(73) Assignee: General Electric Company, Schenectady, NY (US)

( * ) Notice: Subject to any disclaimer, the term of this patent is extended or adjusted under 35 U.S.C. 154(b) by 523 days.

(21) Appl. No.: 12/198,247

(22) Filed: Aug. 26, 2008

(65) Prior Publication Data

US 2010/0058214 A1 Mar. 4, 2010

(51) Int. Cl.
*G06F 3/048* (2013.01)

(52) U.S. Cl.
USPC .......................................... 715/764; 715/769

(58) Field of Classification Search
USPC .......... 715/764, 769, 798–802, 815, 860, 861
See application file for complete search history.

(56) References Cited

U.S. PATENT DOCUMENTS

| | | | |
|---|---|---|---|
| 5,546,527 A | 8/1996 | Fitzpatrick et al. | |
| 5,732,230 A | 3/1998 | Cullen et al. | |
| 5,736,974 A * | 4/1998 | Selker | 715/862 |
| 6,073,036 A * | 6/2000 | Heikkinen et al. | 455/550.1 |
| 6,097,391 A | 8/2000 | Wilcox | |
| 6,169,538 B1 * | 1/2001 | Nowlan et al. | 345/168 |
| 6,230,170 B1 * | 5/2001 | Zellweger et al. | 715/205 |
| 7,075,512 B1 * | 7/2006 | Fabre et al. | 345/156 |
| 7,315,984 B2 * | 1/2008 | Crow et al. | 715/716 |
| 7,366,995 B2 * | 4/2008 | Montague | 715/798 |
| 7,434,177 B1 * | 10/2008 | Ording et al. | 715/862 |
| 7,468,731 B2 * | 12/2008 | Eldridge et al. | 345/581 |
| 7,496,852 B2 * | 2/2009 | Eichorn et al. | 715/764 |
| 7,714,859 B2 * | 5/2010 | Shoemaker et al. | 345/427 |
| 7,773,101 B2 * | 8/2010 | Shoemaker | 345/661 |
| 2002/0000998 A1 * | 1/2002 | Scott et al. | 345/667 |
| 2002/0054117 A1 * | 5/2002 | van Dantzich et al. | 345/766 |
| 2002/0163547 A1 * | 11/2002 | Abramson et al. | 345/855 |
| 2004/0125138 A1 * | 7/2004 | Jetha et al. | 345/764 |
| 2006/0022955 A1 * | 2/2006 | Kennedy | 345/173 |
| 2006/0208264 A1 | 9/2006 | Rasmussen | |
| 2008/0077874 A1 * | 3/2008 | Garbow et al. | 715/764 |
| 2008/0256466 A1 * | 10/2008 | Salvador et al. | 715/762 |
| 2008/0256471 A1 * | 10/2008 | Okamoto | 715/769 |
| 2009/0019348 A1 * | 1/2009 | King | 715/205 |
| 2009/0259959 A1 * | 10/2009 | Grotjohn et al. | 715/769 |

FOREIGN PATENT DOCUMENTS

WO WO9961977 A1 12/1999

OTHER PUBLICATIONS

Acrobat's Loupe Tool: http://acrobatsupport.com/acrobats-loupe-tool/, page last updated Apr. 27, 2009. Retrieved via "The Wayback Machine" on Mar. 29, 2010. (3 pages).

(Continued)

*Primary Examiner* — Enrique Iturralde (74) *Attorney, Agent, or Firm* — Hanley, Flight & Zimmerman, LLC (57) ABSTRACT

A method and system for performing drag and drop operation on a graphical user interface is disclosed herein. The method comprises: enlarging a drop region in a graphical user interface upon focusing on a part of the drop region, the drop region being enlarged in a direction based on the location of the focused part of drop region. In an embodiment the direction of enlargement is in the mirror direction of focused part of the drop region.

22 Claims, 8 Drawing Sheets

(56) References Cited

OTHER PUBLICATIONS

Microsoft Screen Magnifier: http://www.microsoft.com/windowsxp/using/accessibility/magnifierturnon.mspx. Retrieved online on Mar. 29, 2010. (2 pages).

Magnifier Tool in Apple: http://www.apple.com/accessibility/vision/. Retrieved online on Mar. 29, 2010. (4 pages).

Magnifier Tool in Windows Vista: http://www.microsoft.com/enable/training/windowsvista/magnifier.aspx. Retrieved online on Mar. 29, 2010. (1 page).

\* cited by examiner

|   |   |   |   |
|---|---|---|---|
| A1 | A2 | A3 | A4 |
| B1 | B2 | B3 | B4 |
| C1 | C2 | C3 | C4 |
| D1 | D2 | D3 | D4 |

METHOD AND SYSTEM FOR PERFORMING DRAG AND DROP OPERATION

FIELD OF THE INVENTION

This invention relates generally to graphical user interface methods, and more particularly to, a method and system for performing a drag and drop operation in a graphical user interface.

BACKGROUND OF THE INVENTION

In a graphical user interface, a user might need to perform different operations including drag and drop operation. While performing the drag and drop operation it is very essential that the drag component is selected and dropped at the drop region correctly. In the event of an object being dragged and dropped to a drop region having small real estate area, it might be difficult to drop the object at the right drop region. Many times if the operator is not computer savvy and does not have a good grip and control over the user interface, he may need to repeat the drag and drop operation multiple times to drop the object correctly in the drop region. This might result in wastage of time and user dissatisfaction.

Most of the clinical software applications include some kind of drag and drop operation, which helps the users to quickly configure different aspects of the application. In an example, a graphical user interface may be in the form of grids or table that need to be populated regularly. One way to populate theses tables is by dragging and dropping data from a different table or grid or cell. The cell size may be small and hence to drop the data properly may be difficult. The process is error prone and may affect the patient safety. Some of the solutions existing in the industry notify the user as and when the data is improperly placed in the drop region. The user then tries again, until the drag component is dropped appropriately.

Currently there is no mechanism available to assist a user while dropping a drag component in a drop region. In order to increase the productivity and reduce the time and strain of a user in dropping a component to a drop region appropriately, some kind of assistance need to be provided to the user. Hence it will be beneficial to have a mechanism to assist a user while dropping a component in a drop region.

Thus there exists a need to provide a method and system for performing the drag and drop operation by ensuring the accuracy of dropping an object in the correct drop region.

SUMMARY OF THE INVENTION

The above-mentioned shortcomings, disadvantages and problems are addressed herein which will be understood by reading and understanding the following specification.

One embodiment of the present invention provides a method of dropping an object in a graphical user interface. The method comprises: enlarging a drop region in a graphical user interface upon focusing on a part of the drop region, the drop region being enlarged in a direction based on the location of the focused part of drop region.

In another embodiment, a method of modifying an object displayed on a display is described. The method comprises: defining a drag component and a drop region in an object; identifying at least one sub region of the drop region; and zooming in the drop region in a direction with reference to the identified sub region.

In yet another embodiment, a method of displaying an object electronically is provided. The method comprises: defining a drag component and a drop region; dividing a drop region into more than one sub region; focusing on a sub region using a user interface; zooming in the drop region in the mirror direction of focused sub region; and dropping the drag component to the drop region.

In yet another embodiment, a display system is disclosed. The display system comprises: a display for displaying the graphical user interface; an interface configured to facilitate interaction between a user and the graphical user interface; and a controller configured to enlarge a drop region in the graphical user interface upon focusing on a part of the drop region using the interface, the drop region being enlarged in a direction based on location of the focused part of drop region.

In yet another embodiment, a computer-readable media having one or more computer readable medium for displaying an object is disclosed. The media comprises: a routine for enlarging a drop region in a graphical interface upon focusing on a part of the drop region, the drop region being enlarged in a direction based on the location of the focused part of drop region.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments that may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken as limiting the scope of the invention.

Various embodiments of the present invention are directed to drag and drop operations performed in a graphical user interface (GUI). While dropping a component in a drop region in the GUI, the drop region is zoomed in so that the user can drop the component more accurately and quickly. The direction of zooming in may be decided based on position of the user interface on the GUI.

In an embodiment, the invention facilitates automatically enlarging the view of an object in a GUI, while performing a drag operation. For example, if a mouse is used to focus on a part of the drop region of the object, then the drop region is zoomed in a direction with reference to the focused part of the object. The focused part of the object or the location on which the mouse is pointed, decides the direction on which the drop region needs to be zoomed or enlarged. The object may include files, tables, chart objects, picture objects, drawings, tree object, grids, list in a graphic user interface, a panel, image, text document and custom user interface components etc.

In an exemplary embodiment, dropping a component in a table or grid is disclosed. The grid or table includes plurality of cells arranged in a defined manner. Upon focusing on a part of the cell, the cell as such or a part of the cell is zoomed in. The direction of zooming in depends on the location of a user interface on the grid. The drag component may be placed on the zoomed drop region. Once the drag component is placed, the zoomed drop region may be collapsed.

In an embodiment, a display system is disclosed. The system is configured to enlarge a drop region before a component is being dropped. The direction of enlargement is based on the part of the drop region on which the user interface is located.

The term "object" refers any component that could be displayed in an electronic display. The term "drag component" indicates to a component present in the object in the GUI that needs to be dragged and dropped at a different part of the GUI. The "drop region" is the region on a GUI, wherein the drag component needs to be dropped.

Though the example illustrated in the specification mainly deals with tables or grids, the application of the invention need not be limited to this. The invention is applicable to any electronic document such as image, text document, menus, files, tables, chart objects, picture objects, drawings etc. Also the application of the invention may include zooming in displayed objects or part of objects having irregular shape. According to embodiments of the present invention, the application is operable to zoom in one or more drop regions simultaneously upon focusing the user interface on at least one part of the drop regions.

Figure 1:
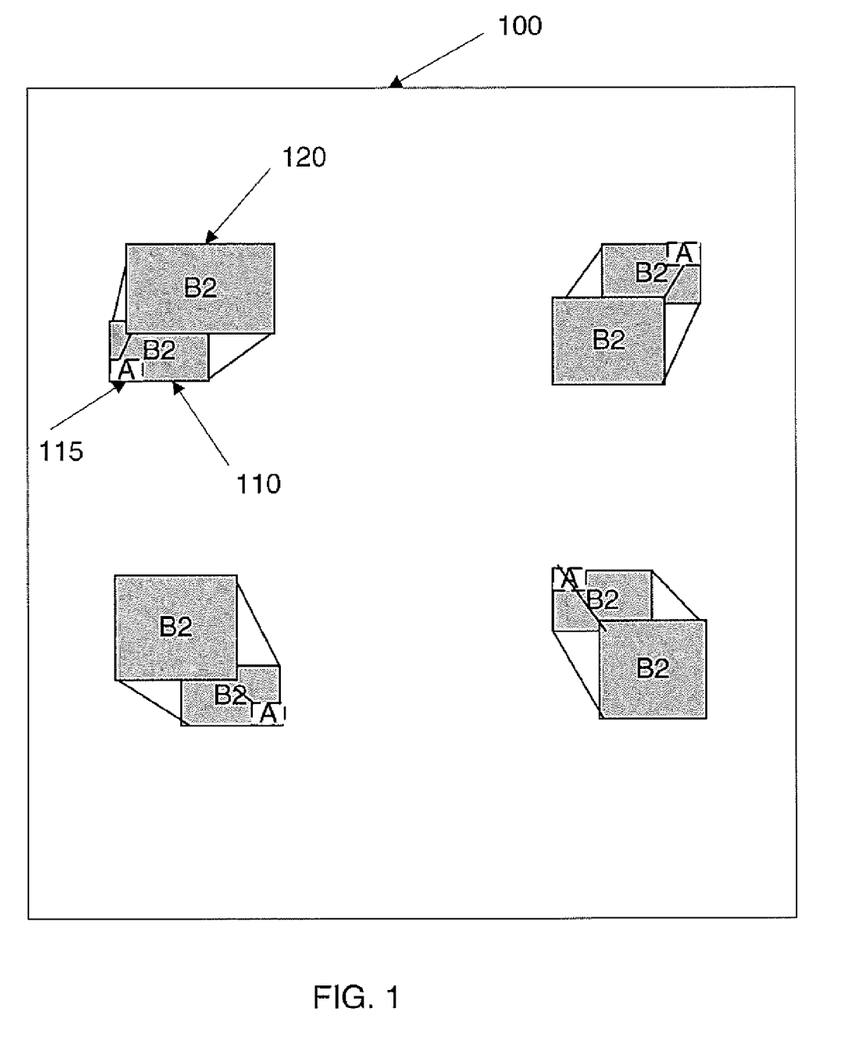
FIG. 1 is a diagrammatic representation illustrating a method of zooming a drop region as described in an embodiment of the invention.

FIG. 1 is a diagrammatic representation illustrating a method of zooming a drop region in as described in an embodiment of the invention. The method of zooming in is illustrated with reference to a drag and drop operation performed in a graphical user interface 100. In an embodiment, a drag component (not shown) is identified and is dragged using a user interface to a drop region 110. However before dropping the drag component in the drop region 110, the user interface focuses on a part 115 of the drop region 110. The drop region 110 is then zoomed, represented as 120, in a direction. The direction of zooming in is decided based on the location of the part of the drop region 115 wherein the user interface is placed. The direction may be selected such that the adjacent cells, or grids are blocked minimally. In an embodiment, the drop region 110 may be projected such that minimum or no adjacent cells are being affected. In an embodiment, layering techniques may be used to make the hidden cells transparent.

In an embodiment, the drop region 110 is distributed in relation to a reference. The distribution can be done in real time or can be done before performing the drag operation. The reference might include an axis. The drop region distribution is done for identifying the location of the part of the drop region in relation to the reference. Thus drop region may be divided into multiple sub regions. The zooming of the drop region 110 may be done with reference to which sub region is being focused by the user interface.

In an embodiment, instead of zooming in the whole drop region 110, a part of the drop region 110 may be projected, so that the neighboring cells are not affected. Once the boundary of the zoomed part of the drop region is identified, the drag component can be placed with ease.

Figure 2A:
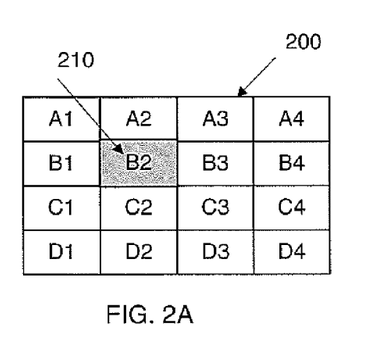
FIG. 2A to FIG. 2F are diagrammatic representations illustrating a method of performing drag operation in a grid like structure as described in an embodiment of the invention.

FIGS. 2A to 2F are diagrammatic representations illustrating the method of performing drag operation in a grid like structure as described in an embodiment of the invention. Method of dragging an object in grid type or table is disclosed. Similar technique may be applied to images, panels etc. FIG. 2A shows a grid structure 200 having multiple cells arranged as four rows and four columns. Many time content of one cell may need to be transferred to another by drag and drop operation or the contents of two cells need to be swapped. In an example, the cell B2 represented as 210 is selected as the drop region.

In FIG. 2 B the selected cell B2, 210, is distributed as different sub regions 205. The sub regions 205 may be distributed based on a reference. In an example shown, the cell B2, 210 is divided as four equal regions based on an imaginary axis passing through the centre of the cell B2, 210. The distribution can be done with reference to location of a region focused by an interface while performing the drag operation. The sub regions 205 may be named as North-West (NW) region, North-East (NE) region, South-West (SW) region and South-East (SE) region. The cell B2, 210, need not be divided into equal regions. The region distribution is configurable.

Figure 2B:
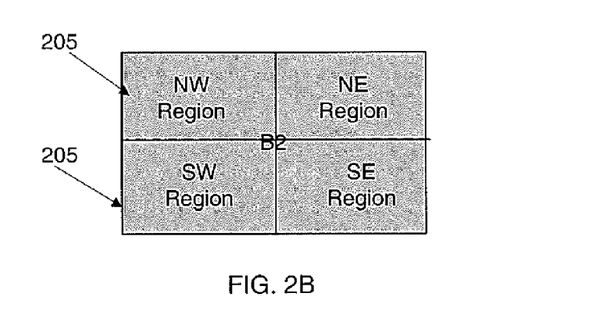

Consider the example of dropping a component to cell B2, 210. The component may be dragged from any other cells shown or may be from a different grid structure. In an embodiment, the component is being dragged to the cell B2, 210 using an interface such as mouse, keypad or any other interfacing devices through which a user can interact with a GUI. Once the user interface focuses on an area, "A" represented as 215, in the drop region i.e. on the cell B2, 210 may be zoomed in. Depending upon the sub region 205 where "A" 215 is located, the cell B2, 210, will be zoomed in. In an embodiment, the cell B2, 210, is zoomed in a mirror direction as that of the focused region "A", 215. The zoomed drop region or cell B2, 210, is presented as 220 and the scaling factor by which the drop region is zoomed need not be limited to the example shown.

Figure 2C:
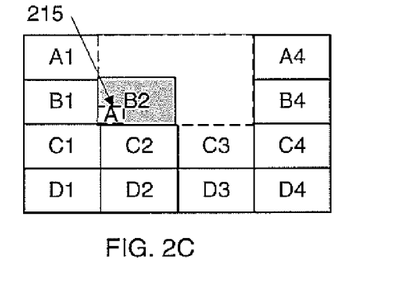

In FIG. 2C the focused region 215 is located in the SW region and hence the drop region, cell B2, 210, will be enlarged in opposite direction i.e. towards NE region. In FIG. 2 C the cell B2, 210, is expanded such that it covers cells A2, A3, B2 and B3.

Figure 2D:
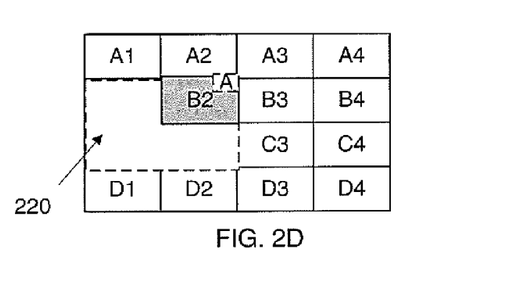

In FIG. 2D, the focused region 215 is located in the NE region and hence the drop region cell B2, 210, will be enlarged in opposite direction i.e. towards SW region. In FIG. 2 D the cell B2, 210 is expanded such that it covers cells B1, B2, C1 and C2.

Figure 2E:
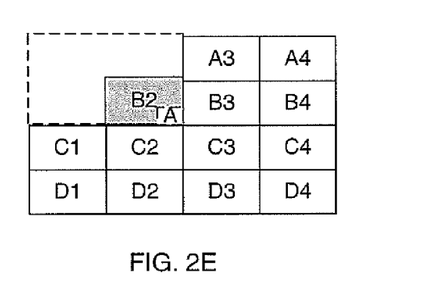

In FIG. 2E, the focused region 215 is located in the SE region and hence the drop region, cell B2, 210, will be enlarged in a direction opposite i.e. towards NW region. In FIG. 2 E the cell B2, 210 is expanded such that it covers cells A1, A2, B2 and B3.

Figure 2F:
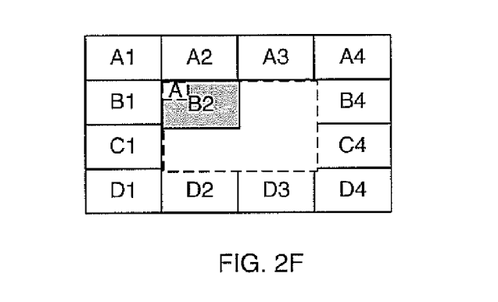

In FIG. 2F, the focused region 215 is located in the NW region and hence the drop region or cell B2, 210 will be enlarged in a direction opposite i.e. towards SE region. In FIG. 2 F the cell B2, 210 is expanded such that it covers cells B2, B3, C2 and C3.

The scaling factor deciding the expansion of the view of cell B2, 210 need not be limited to the examples shown. Based on the application and requirement, the scaling factor may be decided.

In an embodiment, the region distribution may be done in real time based on the location of the interface on the drop region. This is illustrated with reference to FIG. 3.

Figure 3A:
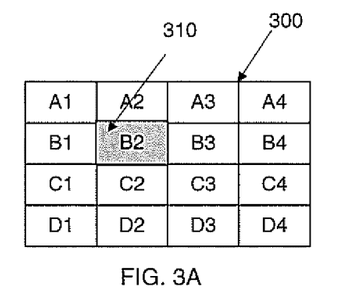
FIG. 3A to FIG. 3F are diagrammatic representations illustrating a method of performing drag operation in a grid like structure as described in another embodiment of the invention.

FIGS. 3A to 3E are diagrammatic representations illustrating a method of performing drag operation in a grid like structure as described in another embodiment of the invention. FIG. 3A shows a grid 300 wherein a cell B2, 310, is identified as the drop region. For dropping a component to the cell B2, 310, and component is being dragged till the cell B2. Before dropping the component to the cell B2, 310, the user interface that drags the component towards the cell B2, 310, points on to a particular point or region on the cell B2, 310. The location of the interface on the cell B2, 310, is identified based on a reference. In an embodiment shown, the reference is an axis passing through the center of the cell. Once the location of the interface is identified, the direction of zooming in the cell B2, 310, may be decided. Once the drop region cell B2 is zoomed in, the user can drop the component to the cell B2 more accurately and with ease.

Figure 3B:
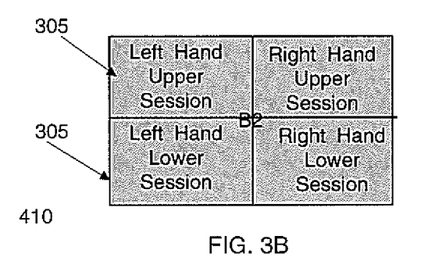

In FIG. 3B the selected cell B2, 310, is distributed as different sub regions 305. The sub regions 305 may be distributed with reference to the location of a user interface such a pointer on the grid 300, based on a reference. In an example shown, the cell B2, 310 is divided as four equal regions based on an imaginary axis passing through the centre of the cell B2, 310. The distribution can be done with reference to location of an interface on the drag region or cell 310. The sub regions 305 may be named as Left Hand Upper Section, Left Hand Lower Section, Right Hand Upper Section and Right Hand Lower Section.

Figure 3C:
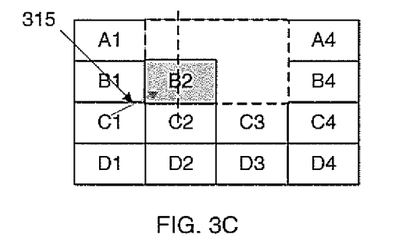

In FIG. 3C, the location of the interface is at the Left Hand Bottom Section 315, and the cell B2, 310 is zoomed in the opposite direction i.e. towards the Right Hand Upper Section.

Figure 3D:
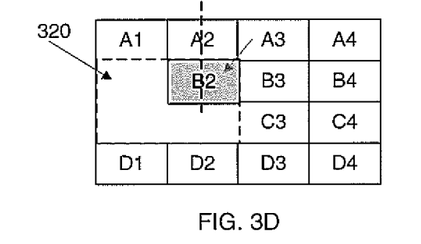

In FIG. 3D, the location of the interface is at the Right Hand Upper Section 315 and hence the cell B2, 310, is projected towards the Left Hand Bottom Section.

Figure 3E:
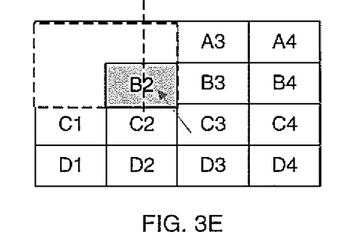

In FIG. 3E, the location of the interface is identified as the Right Hand Bottom Section 315 and the cell B2, 310, is projected towards the Left Hand Upper Section.

Figure 3F:
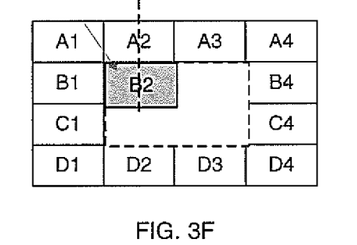
Figure 4A:
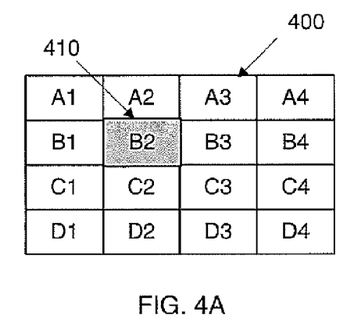
FIG. 4A to FIG. 4E are diagrammatic representations illustrating a method of performing drag operation in a grid like structure as described in an alternate embodiment of the invention.
Figure 4B:
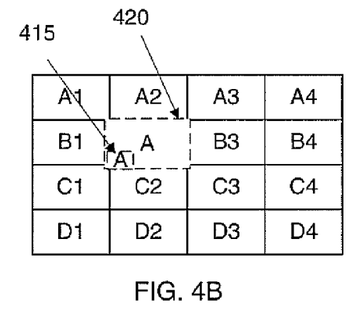
Figure 4C:
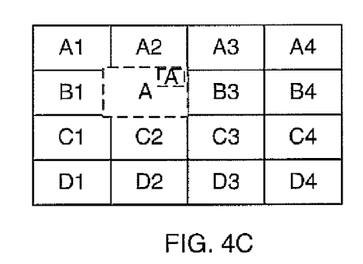
Figure 4D:
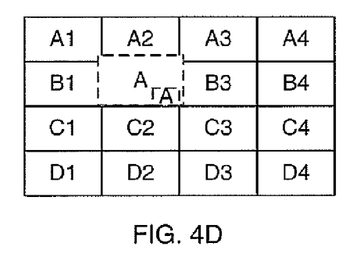
Figure 4E:
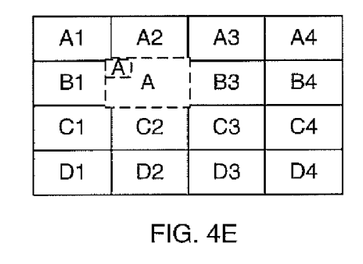

In FIG. 3F, the location of the interface is identified as Left Hand Upper Section 315 and the cell B2, 310 is projected in the Right Hand Bottom Section.

The enlarged view of the cell B2, 310 is represented as 320.

In an embodiment, the drop region may also be zoomed in for a configurable time, as it will help the user in selecting the drag component correctly.

In an embodiment, the drop region might be kept zoomed even after dropping the drag component into the drop region. This will help the user in analyzing or reviewing the drag component.

In an embodiment, instead of expanding the whole cell B2, 310, a part of the cell may be expanded. This is illustrated with reference to FIGS. 4A to 4E.

FIG. 4A to FIG. 4E are diagrammatic representations illustrating a method of performing drag operation in a grid like structure as described in an alternate embodiment of the invention. In an embodiment, instead of expanding the cell B2 410, a part of the cell 415 may be expanded. In an example, a part of the cell B2, represented as "A", 415 that is focused by an interface may be extended. The boundary of the extended focused part "A" 420 is identified and the drag component may be placed with reference to the same. In this case the, view of the neighboring cells are not affected. The focused part 415 is extended in a direction mirror view direction as that of the focused part. Different parts of the cell is projected in different directions as shown in FIGS. 4B to 4E. Even though the embodiment is illustrated using grid structure, this may be applied to images or panels. In an example, the grid itself may be very small and hence the cells cannot be projected more that a desired scaling factor and hence the drag region may be expanded as illustrated. In an example, if the drag component and the drop region are located close by, the drag region may be expanded as illustrated.

In an embodiment, the GUI may be an image having irregular shape. An object in the image may need to be moved to another. For example, while editing a photograph, some objects having irregular shapes may need to be moved from one location to other. An appropriate drag component is selected and the size of the drop region may be decided or adjusted based on the size of the drag component. In an embodiment the image includes medical images.

In an embodiment, the time up to which the drop region or part of drop region needs to be zoomed, may be configured. In an example, the drop region may need to be zoomed in even after the object is being drooped into the drop region. This may assist in reviewing or analyzing the dropped component.

Figure 5:
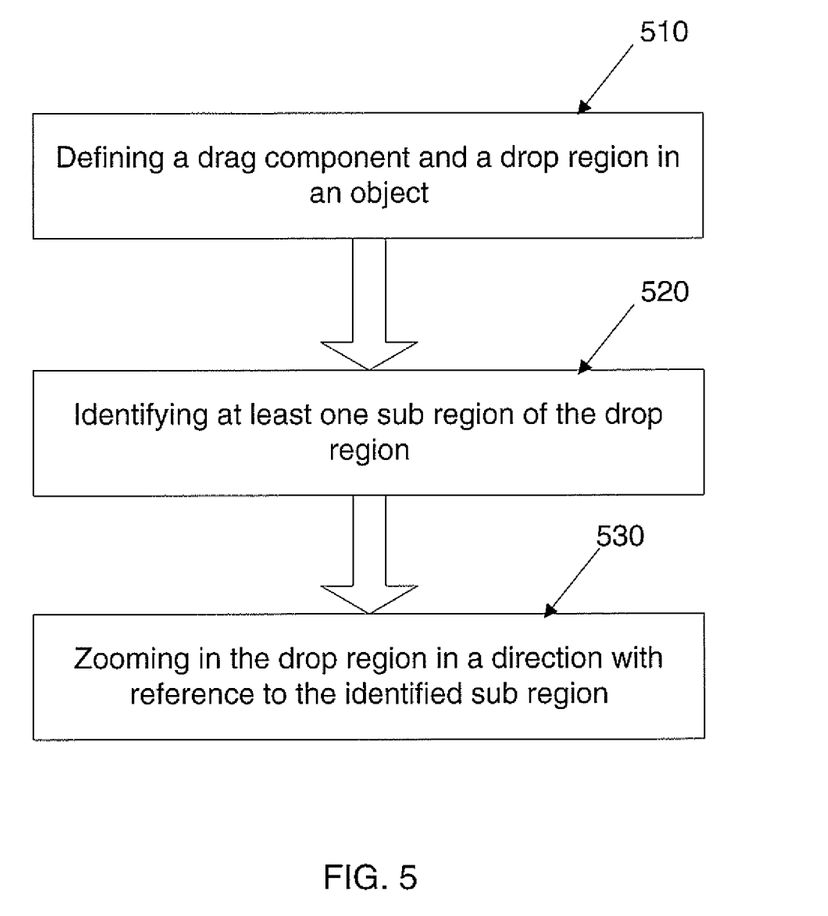
FIG. 5 is a flowchart illustrating a method of modifying an object in a graphical user interface as described in an embodiment of the invention.

FIG. 5 is a flowchart illustrating a method of modifying an object in a graphical user interface as described in an embodiment of the invention. In an embodiment an object displayed in an electronic medium may be modified. The object in a GUI may include files, tables, chart objects, picture objects, drawings, tree object, grids, list in a graphic user interface, a panel, image, text document etc. At step 510 a drag component and a drop region are defined in an object. The drag component and the drop region need not necessarily be part of the same object. Drag component and the drop region are defined based on the user requirement. Once the drag component is defined, it is dragged towards the drop region to drop it into the drop region. At step 520, at least one sub region of the drop region is identified. In an embodiment, the sub region may be a part where the user interface may be focused for dropping the component. The drop region may be distributed as sub regions. The region distribution is configurable and in an embodiment it is done with reference to an axis. The region distribution can be done in real time or can be done in advance to the drag and drop operation. At step 530, the drop region is zoomed in a direction decided with reference to the identified sub region. In an embodiment, the drop region is zoomed in an opposite direction or mirror direction of the focused region. The drop region may not be zoomed in as a whole, but a part of the drop region may be zoomed in. The drop region may be zoomed in any direction. The drop region may be zoomed in for a configurable time or the drop region may zoom out once the drag component is dropped into the drop region.

Figure 6:
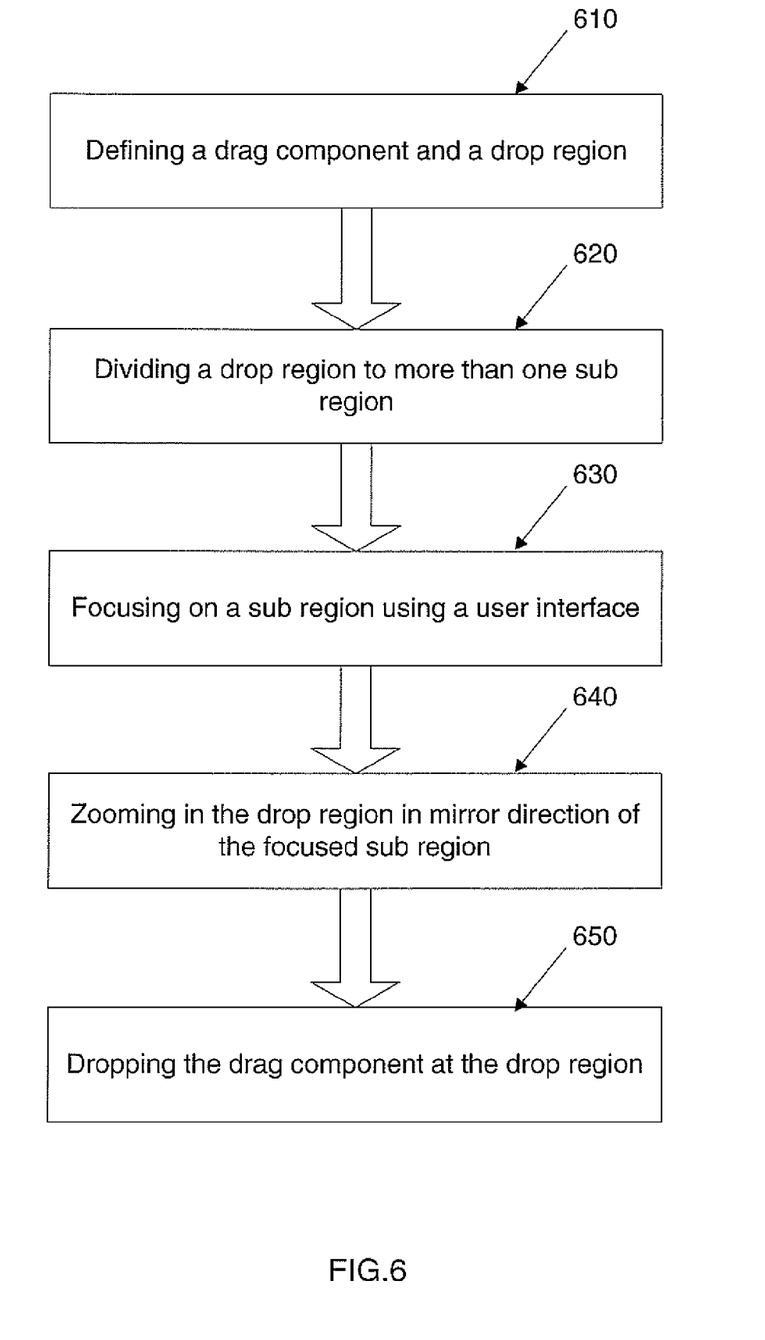
FIG. 6 is a flowchart illustrating a method of displaying an object in a graphical user interface as described in an embodiment of the invention.

FIG. 6 is a flowchart illustrating a method of displaying an object in a graphical user interface as described in an embodiment of the invention. At step 610, a drag component and a drop region are defined. The drag component and the drop region may be part of the same object or may be selected from different objects. While identifying the drag component, the drag component or the area surrounding the drag components being selected could be highlighted or zoomed in to assist a user in identifying the drag component. The drag component needs to be dragged and dropped in the drop region. The drop region could be identified by a user, based on various applications. At step 620, the drop region is divided into different sub regions. The region distribution could be configurable and could be done based on a reference. In an example, the reference could be an axis based on which the area of drop region may be divided into different section. In an example, a cell in a grid may be divided into four equal regions with reference to an imaginary axis passing through the center of the cell. At step 630, an interface is focused on the drop region. The sub region on which the interface is located or the sub region on which the focused region exists is identified. The location of the focused region is identified. At step 640, the drop region or a part of the drop region is being projected in mirror direction of the focused region in the drop region. The scaling factor with which the drop region being zoomed is variable and can be decided based on applications. At step 650, the drag component is dropped to the zoomed drop region. Once the drag component is dropped, the zoomed drop region may zoom out or it could be kept zoomed for some time.

Figure 7:
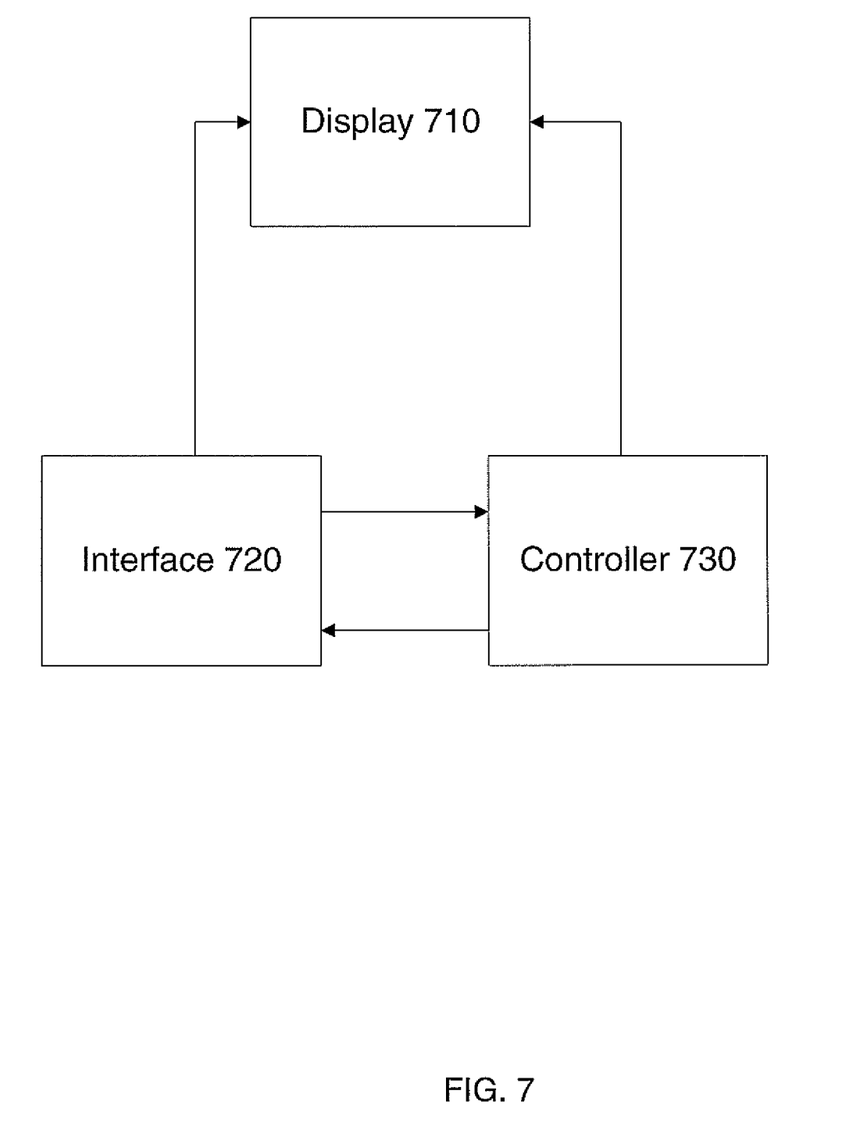
FIG. 7 is a block diagram of a display system as described in an embodiment of the invention.

FIG. 7 is a block diagram of a display system as described in an embodiment of the invention. The system includes a display 710, capable of displaying a GUI, an interface 720 configured to facilitate interaction between a user and the display 710. The system further includes a controller 730 for controlling an object displayed on the display 710 based on the instructions from a user, the instructions being provided through the interface 720. The display 710 might be any electronic display including a computer monitor, display panel or a CRT display. The interface 720 is connected to the display 710 to facilitate interaction of user with the display 710. The user gives his instructions to modify to the objects displayed on the display 710 through the interface 720. The interface 720 could include, a mouse, keypad, light pen etc, but it could be any interfacing device that could be used to interact with the display 710. The controller 730 is a processor, which controls the display 710 based on the user instruction. Using the interface 720, the user may select the drag component and a drop region. Once the drag component and the drop region are selected, the drag component may be dragged towards the drop region using the interface 720.

The controller 730 is configured to divide the drop region into different sub regions. This could be done based on a reference. The region distribution could be done prior to drag and drop operation or could be done while the drag and drop operation is being performed. The interface 720, while performing the drag operation, focuses on a part of the drop region. The part of the drop region is used to identify the location or the sub region at which the interface 720 or the focused region is located. Once the controller 730 identifies the sub region on which the focused part of the drop region is located, the drop region is zoomed in a direction opposite to that of the focused region. Once the drop region is zoomed in, the user can drop the drag component into the drop region. Once the drag component is dropped, the zoomed drop region may zoom out or else the drop region may remain zoomed for a configurable period of time. This helps the user to review the contents of the zoomed drop region, further ensuring the proper dropping of the drag component.

Figure 8:
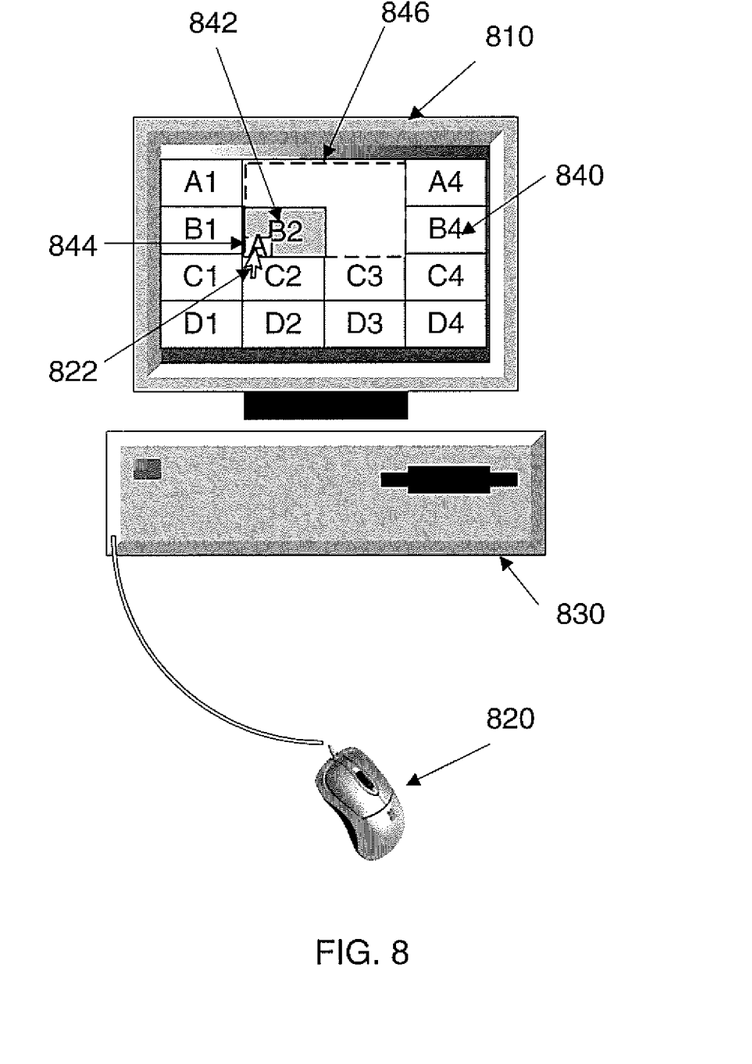
FIG. 8 is a pictorial representation of a display system, zooming in a drag region as described in an embodiment of the invention.

FIG. 8 is a pictorial representation of a display system zooming in a drag region as described in an embodiment of the invention. The system includes a computer monitor 810 as the display wherein a GUI in the form of a grid 840 is displayed. A cell B2, 842 in the grid 840 is selected as the drop region. A mouse 820 is connected as the user interface and facilitates interaction of a user with the GUI. Once the drag component is identified, it is selected using the mouse and dragged to the drop region. A processor 830 is configured to control the display of the grid 840 in the monitor 810. The processor 830 is configured to divide the cell B2, 842, which is identified as the drop region, into various sub regions using a reference. This could be done while the drag operation is being performed or once the drop region is identified. For dropping the drag component to cell B2, the mouse 820 points a pointer 822 on a part of the drop region or cell B2, shown as 844. Once the mouse 820 points at a part of the cell 844, the location of the part is identified. Alternately, the location of the pointer 822 may be identified. Based on the location information, the processor 830 decides to enlarge the cell B2, 842, before dropping the component into the cell B2, 842. In an embodiment, the cell B2, 842 may be enlarged in a direction opposite to the focused part of the drop region 844. More specifically, the cell B2, 842 may be enlarged in a mirror view direction of the focused part. The zoomed cell B2 may be represented as 846.

The direction of enlargement can be configurable based on the location of the cell in the grid or based on the nature of the grid. For example, if a cell at the corner of grid is the drop region, then it may not be feasible to enlarge the drop region in all direction. So either the direction or the scaling factor needs to be restricted based on the location or application of the cell. Further, if the drag component and drop region are adjacent cells, then zooming into the direction in which drag component is located may be avoided. Thus the direction of zooming in is configurable and could be decided based on the location at which the pointer is pointed at the GUI or the small region where the pointer is located on the GUI.

In an embodiment, the drop region may be highlighted even after the object is being dropped into the drop region. This will help the user in analyzing the drag component.

In an embodiment, the display system could be a medical imaging system having a display screen configured to display various medical images. The technique described with reference to the grids and cells are applicable to images as well.

The advantages of the invention include improving workflow for modifying the contents of a GUI. The invention eliminates the error in dropping a component to a drop region. If the invention is used in clinical application, the method ensures patient safety. Also the invention helps in improving the productivity and the saving time in dragging dropping objects. This relives the stress of the user and provides user delight.

The above-description of the embodiments of the methods and systems have the technical effect of enlarging a drop region before dropping a component to the drop region.

Thus the method and system facilitates enlarging a drop region in a direction, before dropping the object.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments are described above in detail. The assemblies and methods are not limited to the specific embodiments described herein, but rather, components of each assembly and/or method may be utilized independently and separately from other components described herein. Further the steps involved in the workflow need not follow the sequence in which there are illustrated in figures and all the steps in the work flow need not be performed necessarily to complete the method.

While the invention has been described with reference to preferred embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

We claim:

1. A method of dropping an object in a graphical user interface comprising:
   distributing a drop region as various parts based on a reference associated with the drop region, wherein the drop region distribution in relation to the reference is configurable;
   focusing the graphical user interface on a part of the drop region based on the object being dragged into the drop region via the graphical user interface; and
   enlarging the drop region in the graphical user interface in response to focusing on the part of the drop region, the drop region being enlarged in a mirror direction of the location of the focused part of drop region with respect to the reference and the drop region being enlarged such that the drop region obscures at least a portion of the drop region different than the focused part.

2. A method as claimed in claim 1, wherein the reference includes an axis.

3. A method as claimed in claim 1, wherein method further comprises: distributing the drop region as various parts based on location of a user interface on the drop region.

4. A method as claimed in claim 1, wherein the method comprises: enlarging the drop region in the mirror direction of the focused part of drop region.

5. A method as claimed in claim 4, wherein the method further comprises: keeping the drop region enlarged for a configurable time.

6. A method as claimed in claim 4 further comprising: enlarging at least a portion of the drop region for a configurable period of time.

7. A method as claimed in claim 1, further comprising dropping an object to the enlarged drop region.

8. A method as defined in claim 1, wherein enlarging the drop region comprises maintaining at least a portion of a boundary of the focused region in the same position.

9. A method as defined in claim 1, wherein the drop region is enlarged only in the mirror direction of the location of the focused part of drop region with respect to the reference.

10. A method as defined in claim 1, further comprising determining the mirror direction of the location of the focused part of drop region based on the reference and the location of the focused part of the drop region.

11. A method of modifying an object displayed in a display comprises:
    defining a drag component and a drop region in an object;
    identifying at least one sub region of the drop region, said identifying comprising:
       dividing the drop region into a plurality of sub regions based on a reference; and
       focusing a graphical user interface on a sub region based on the object being dragged into the sub region via the graphical user interface;
    identifying a location of the focused sub region in relation to the reference; and
    zooming in the drop region in a mirror direction from the focused sub region with respect to the reference, said zooming comprising:
       zooming in the drop region in a direction, the direction being decided based on the location of the focused sub region, and the drop region being zoomed in such that the zoomed in drop region obscures at least a portion of a non-focused sub region.

12. A method as claimed in claim 11, further comprising: zooming in the drop region in mirror direction of the focused sub region.

13. A method as claimed in claim 11, wherein the object includes: files, tables, chart objects, picture objects, drawings, tree object, grids, list in a graphic user interface, a panel, image, text document and custom user interface components.

14. A method as claimed in claim 11 further comprising: zooming in at least one sub region of more than one drop regions for a configurable period of time.

15. A method as claimed in claim 11 further comprising dropping the drag component to the drop region.

16. A method as claimed in claim 11, wherein the dividing comprises: dividing the drop region into four equal regions.

17. A method as claimed in claim 16, wherein the object includes table and grids.

18. A method as defined in claim 11, wherein the reference is at least one of a location or a plane at least partially within the drop region.

19. A method as defined in claim 11, wherein zooming in the drop region comprises maintaining at least a portion of a boundary of the focused sub region in the same position.

20. A display system comprising:
    a display for displaying the graphical user interface;
    an interface configured to facilitate interaction between a user and the graphical user interface and to focus on a part of a drop region when a component represented on the display is dragged into the drop region; and
    a controller configured to enlarge the drop region in the graphical user interface in response to the interface focusing on the part of the drop region, the drop region being enlarged in a mirror direction from the location of the focused part of the drop region with respect to a reference and the drop region being enlarged such that the enlarged drop region obscures at least a portion of the drop region different than the focused part, wherein the controller is configured to distribute the drop region into parts based on at least one of the location of the focused part of the drop region and location of the user interface on the graphical user interface.

21. A non-transitory computer-readable medium having one or more computer readable media for displaying an object comprising:
    a routine for distributing a drop region in a graphical interface as various parts based on a reference associated with the drop region, wherein the drop region distribution in relation to the reference is configurable;
    a routine for focusing the graphical user interface on a part of the drop region based on the object being dragged into the drop region via the graphical user interface; and
    a routine for enlarging the drop region in response to focusing on the part of the drop region, the drop region being enlarged in a mirror direction from the location of the focused part of the drop region with respect to the reference and the drop region being enlarged such that the enlarged drop region obscures at least a portion of the drop region different than the focused part.

22. A computer-readable medium as defined in claim 21, wherein the reference is at least one of a location or a plane at least partially within the drop region.

\* \* \* \* \*

UNITED STATES PATENT AND TRADEMARK OFFICE
CERTIFICATE OF CORRECTION

| | | |
|---|---|---|
| PATENT NO. | : 8,607,148 B2 | Page 1 of 1 |
| APPLICATION NO. | : 12/198247 | |
| DATED | : December 10, 2013 | |
| INVENTOR(S) | : Singh et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 650 days.

Signed and Sealed this
Fourteenth Day of April, 2015

Michelle K. Lee
*Director of the United States Patent and Trademark Office*